Figure 1:
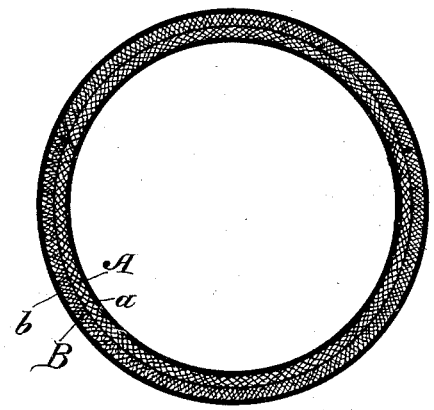

(No Model.)

A. BRUEGGER, Jr.
RUBBER HOSE.

No. 331,374. Patented Dec. 1, 1885.

Witnesses:

Inventor:
Abraham Bruegger Jr
by Munday Evarts & Adcock
his attys.

UNITED STATES PATENT OFFICE.

ABRAHAM BRUEGGER, JR., OF CHICAGO, ILLINOIS.

RUBBER HOSE.

SPECIFICATION forming part of Letters Patent No. 331,374, dated December 1, 1885.

Application filed June 5, 1885. Serial No. 167,724. (No model.)

*To all whom it may concern:*

Be it known that I, ABRAHAM BRUEGGER, Jr., a citizen of the United States, residing in Chicago, in the county of Cook and State of Illinois, have invented a new and useful Improvement in Rubber Hose, of which the following is a specification.

My invention relates to certain improvements in rubber hose.

Heretofore rubber hose has been made of duck or other like material, with a rubber lining both inside and outside, and with the several layers or plies of the duck cemented together. Rubber hose of this kind, while it has not only an inside but an outside rubber lining to protect the duck or fibrous material from becoming wet or water-soaked, and also from wear or injury when it is handled and drawn over the pavements, is still nevertheless not very durable. The reason of this is twofold—first, because such hose has in itself, from the moment of its vulcanization by the steam, the seeds of its own decay in the moisture which is necessarily and unavoidably confined in the duck or fabric between the inside and outside rubber linings, and which can never afterward escape.

I am aware that attempts have heretofore been made to obviate this difficulty in a measure by saturating or partially saturating the duck with some preservative substance prior to the vulcanization of the hose; but such attempts have proved of but little practical utility, because the high heat to which the hose is subjected for a great length of time in the vulcanizing-bath will pretty effectually dissipate or drive out most preservative substances, and because no really effective preservative substances can be used without interfering with the process of vulcanization and the cementing of the several layers of duck together into one homogeneous tube. Another reason for the short life of this kind of rubber hose is due to the fact that it has to be subjected to a high heat in the vulcanizing-chamber for so long a time, especially where the hose is made of any considerable thickness, that the duck or fabric is often liable to be rendered "dead," its life taken away, its strength and structure greatly injured by the heat. Heretofore, also, rubber hose has been made of circular or tubular fabric, woven or knitted, having an inside rubber lining. In this way, as the rubber to be vulcanized is simply a lining upon the inside of the tube with which the steam comes directly in contact, the hose can be quickly vulcanized, and without injury to the fabric, and as there is no outside rubber lining there is of course no difficulty in thoroughly drying the fabric; but this kind of hose is open to other and even more serious objections than the former, because, having no outside rubber lining, the fabric soon becomes filled with mud and dirt, and getting soaked with water every time it is used, and it being practically impossible to thoroughly dry it out every time, the hose is frequently wound up on its reel more or less moist, and it soon becomes weak and unfit for use. Having no outside rubber protection, this kind of hose wears out quickly in being handled and drawn over the pavements, and is very liable to external injury. Another serious objection to this kind of hose is that it cannot be used without liability to injury in cold weather when the water freezes into ice, because the outside fabric becoming saturated with water (more or less) and then congealed, the hose becomes stiff and rigid, so that it cannot be handled or bent without breaking. It is true that these difficulties in this kind of hose can to some extent be prevented by saturating the outside fabric with oils or preservatives; but such substances will only remain in the fabric for a limited time, being exposed to the atmosphere, and at best they only afford a partial protection, while they render the hose very dirty, greasy, and disagreeable to handle.

It is the object of my invention to produce a hose having none of the defects or disadvantages of either of these old kinds of hose, while it combines in itself all the merits or advantages of both of them; and to this end my invention consists in a rubber hose made of an inside and an outside part, the former having an inside rubber lining and the latter having an outside rubber lining, the outside part or tube being drawn over the inside part or tube after each has been separately vulcanized.

In making my improved hose the inside part or tube is or may be made and vulcanized in the usual manner—that is to say, a plastic rubber sheet or sheets being wrapped around a suitable mandrel, a circular or tubular fabric, preferably woven, is drawn over it, when it is subjected to the vulcanizing process. The outside part or tube is made in a similar manner, excepting that the tubular woven or knitted fabric is first drawn over the mandrel and the plastic rubber sheet then wrapped around it on the outside, when it is also vulcanized. The fabric on the inside of the outside tube is then thoroughly dried, as well as the fabric on the outside of the inside tube. The fabric of both the inside and the outside tubes then is, or should be, saturated or partially saturated with some preservative substance—such as tar, paraffine, wax, linseed-oil, or cotton-oil, or other preservative substances—and then the outside tube or part is drawn over the inside tube or part. The coupling-pieces at the ends of each section of hose will effectually exclude any dirt, moisture, or water from getting in between the two rubber-lined tubes or parts of which the hose is composed. In this way no moisture is shut up between the inside and outside rubber linings of the hose in the process of vulcanization, and the rubber linings can be quickly vulcanized, so that there is little danger of the fabric being injured by the heat; and I am also enabled to saturate the fabric with preservatives, and keep it so saturated to the proper extent, as the rubber lining on the outside effectually prevents its escape or dissipation, while the fabric is at the same time completely protected from wet or injury from the outside. My hose also, by reason of its being composed of two distinct or separate parts or tubes, is also much more soft and flexible than the same strength or thickness of hose made in either of the old ways.

Figure 2:
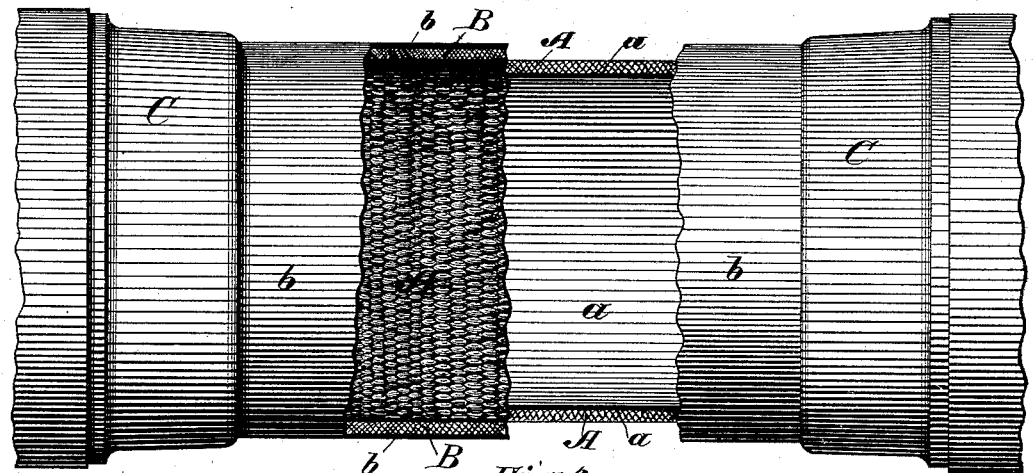
Figure 3:
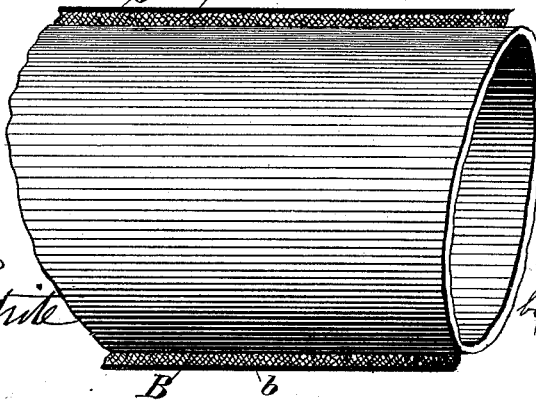

In the accompanying drawings, which form a part of this specification, and in which similar letters of reference indicate like parts, Figure 1 is a cross-section of my improved hose. Fig. 2 is a side elevation, showing part in longitudinal section; and Fig. 3 is a side view of a short piece of a mandrel, showing the method of making the outside tube or part of the hose.

In said drawings, A represents the inside fabric tube, preferably woven in circular or tubular form, and provided with the inside rubber lining, $a$, and B the outside fabric tube, provided with the outside rubber covering, $b$. The fabric tubes A and B may be each made or woven of one, two, three, or more plies thickness, as may be desired; and, if desired, one or more fabric tubes having no rubber linings may be inserted between the inside rubber-lined tube, A, and the outside rubber-covered tube, B. After the tubes $Aa$ $Bb$ have been separately made and vulcanized, the fabrics A B should be impregnated with a preservative substance—such as before mentioned—and then the tube $Bb$ is drawn over the tube $Aa$. C C are the ordinary metallic couplings at the ends of each section of hose, and which, clamping the hose in the usual manner, serve to effectually bind the two parts $Aa$ and $Bb$ together, and to prevent any moisture or dirt from getting in between them, and also to prevent the preservative substance from being dissipated by exposure to the air.

I do not herein claim the process of making my improved rubber hose, but reserve the same as the subject of a separate application to be filed prior to the issue of a patent upon this application.

I hereby disclaim the hose shown and described in the Letters Patent No. 159,345, of February 2, 1875, to J. Murphy, and in the Letters Patent No. 186,123, of January 9, 1877, to D. C. Gately. In my invention the outside fabric tube has only an outside rubber covering and the inside fabric tube has only an inside rubber lining, so that the two fabric tubes are separate, and in no way joined or cemented together, (except by the coupling devices at their ends,) and the outside fabric surface of the inside fabric tube rests directly against the inside fabric surface of the outside tube. It is by this means that I am enabled to thoroughly dry the fabric material of both tubes after they have been separately formed and vulcanized, as before described, and also to properly impregnate the fabric material of both tubes with antiseptic or preservative substances. I also disclaim the hose shown and described in Letters Patent No. 27,553, of March 20, 1860, to T. J. Mayall.

I claim—

1. The hose consisting of two separately-vulcanized tubes, one an inside fabric tube, A, having only a rubber lining, $a$, and the other an outside fabric tube, B, having only an outside rubber covering, $b$, the latter drawn over the former after vulcanization, substantially as specified.

2. The hose consisting of two tubes which have been separately vulcanized, one an inside fabric tube, A, having rubber lining $a$ only upon its inside, and the other an outside fabric tube, B, having rubber covering $b$ only upon its outside, said fabrics A B, between said rubber lining $a$ $b$, being impregnated with a preservative before they are united, substantially as specified.

3. The combination, with inside tube, $Aa$, of outside tube, $Bb$, separately vulcanized, and couplings C C at the ends of the hose-section to bind the said tubes together and exclude dirt and moisture from between them, the outside fabric surface of the tube A being in juxtaposition with the inside fabric surface of the tube B, and the rubber linings $a$ $b$ being only upon the inside of tube A and the outside of tube B, substantially as specified.

4. The hose consisting of two separately-vulcanized tubes, one an inside fabric tube having only an inside rubber lining, and the other an outside fabric tube having only an outside rubber covering, the latter drawn over the former, said fabrics being impregnated
5 with preservatives before they are united, and closed or joined together at their ends to prevent the escape of the preservatives or the admission of moisture between said fabric tubes, substantially as specified.

ABRAHAM BRUEGGER, JR.

Witnesses:
EDMUND ADCOCK,
JOHN W. MUNDAY.